United States Patent [19]

Hamano et al.

[11] 4,369,910
[45] Jan. 25, 1983

[54] METHOD OF CONNECTING ARMATURE COIL OF ROTARY MACHINE

[75] Inventors: Isao Hamano; Kiyoshi Yabunaka, both of Hyogo, Japan

[73] Assignee: Mitsubishi Denki Kabushiki Kaisha, Tokyo, Japan

[21] Appl. No.: 198,007

[22] PCT Filed: Apr. 24, 1980

[86] PCT No.: PCT/JP80/00086
 § 371 Date: Oct. 14, 1980
 § 102(e) Date: Oct. 14, 1980

[87] PCT Pub. No.: WO80/02480
 PCT Pub. Date: Nov. 13, 1980

[30] Foreign Application Priority Data

Apr. 27, 1979 [JP] Japan ................................. 54-53921

[51] Int. Cl.³ ............................................. B23K 20/10
[52] U.S. Cl. ................................................... 228/110
[58] Field of Search ................................. 228/1 R, 110

[56] References Cited

U.S. PATENT DOCUMENTS 2,985,954 5/1961 Jones et al. ...................... 228/110
3,128,649 4/1964 Avila et al. ..................... 228/1 R
3,440,118 4/1968 Obeda ........................... 228/110 X
3,791,569 2/1974 Mims ............................. 228/1 R
3,848,792 11/1974 Mims ............................. 228/1 R

FOREIGN PATENT DOCUMENTS 1446162 8/1976 United Kingdom .

Primary Examiner—Kenneth J. Ramsey
Attorney, Agent, or Firm—Oblon, Fisher, Spivak, McClelland & Maier

[57] ABSTRACT

The present invention relates to a method of connecting a coil end by using ultrasonic welding to a commutator fitted in the circumference of a shaft and formed by molding with a molded substrate a plurality of segments to be in one piece. In the ultrasonic welding, vibration is applied to the coil end in such a direction that a component of the vibrating force in the axial direction of the shaft is smaller than the bonding strength between the molded substrate and the segment. The method of the invention is suitable for connecting an armature coil of a rotary machine such as a starter motor etc. to a commutator.

2 Claims, 4 Drawing Figures

METHOD OF CONNECTING ARMATURE COIL OF ROTARY MACHINE

FIELD OF THE INVENTION

The present invention relates to a method of connecting the armature coil of rotary machine for connecting the armature coil used in the rotary machine such as a starter motor etc. to a commutator by ultrasonic welding.

BACKGROUND OF THE INVENTION

FIG. 1 is a schematic view of an armature prepared by the conventional process and FIG. 2 is a sectional view of an apparatus for the conventional method of connecting an armature coil of rotary machine.

Referring to FIGS. 1 and 2, the conventional method will be described. In FIGS. 1 and 2, (1) designates the shaft of a starter motor; (2) designates an armature core fixed to the shaft; (3) designates an armature coil held in a wound form in slots (not shown) provided in the armature core; (3a) designates a coil end of the armature coil; (4) designates a commutator to which the coil end (3a) of the armature coil is connected and which comprises a plurality of segments (5) positioned in a peripheral direction of the shaft (1) and a molded substrate (7) molded in one piece with a bushing (6) fitted on the shaft (1), the end portion of the segments (5) being bonded by the end portion (7a) of the molded substrate (7). The reference numeral (8) designates an ultrasonic welding apparatus for welding the segments (5) to the coil ends (3a) of the armature coil by ultrasonic wave; (9) designates a power source for producing ultrasonic wave; (10) designates a coil; (11) designates a magnetostriction transducing element; (12) designates a horn and (13) designates a tip.

A method of the ultrasonic welding of the segment (5) to the coil end (3a) of the armature coil (3) of the starter motor armature having the structure mentioned above will be described. The coil ends (3a) are superposed in parallel each other and laid on the segment (5) and the coil ends (3a) are pressed from the top by the tip (13) at a compressive force (Pa) and at the same time, ultrasonic vibration (Fa) is applied to the segment (5) secured in the axial direction of the shaft (1) in parallel to this direction as shown in FIG. 2. Frictional heat is produced in the coil end (3a) of the armature coil and the segment (5) by applying ultrasonic vibration energy to result in the welding of both members; thus, the armature coil is connected to the segment.

In the conventional ultrasonic welding method described above, it is necessary to prevent a peel-off phenomenon of the segment (5) from the molded substrate (7) and occurence of the cracking of the molded substrate end (7a), which cause overspeed strength failure of the commutator, because the ultrasonic vibration of the coil end (3a) caused by the friction excites the segment (5) to vibrate it. Accordingly, it is necessary to increase the bonded area between the segment and the molded substrate or to form the segment (5) in a complicated shape or to increase the thickness of the end portion (7a) of the molded substrate in order to enhance the bonding strength of the molded substrate (7) to the segment (5). These attempts result in the increase of production cost and poor mass productivity disadvantageously.

DISCLOSURE OF THE INVENTION

It is an object of the present invention to provide a method of connecting an armature coil of a rotary machine by welding under application of vibration to the armature coil so that a component of vibrating force in the axial direction of a motor shaft is smaller than the bonding strength of the molded substrate to the segment when the armature coil is vibrated in the ultrasonic welding of the armature coil to the commutator. In accordance with the present invention, the disadvantage of the conventional ultrasonic welding method causing decrease of bonding strength between the molded substrate and the segment and the cracking of the molded substrate can be overcome and the reduction of working cost and improvement of strength for the commutator can be attained since it is unnecessary to conduct a special molding operation or to form the segment and the molded substrate in a special shape to assure the bonding strength.

PREFERRED EMBODIMENT OF THE INVENTION

Figure 1:
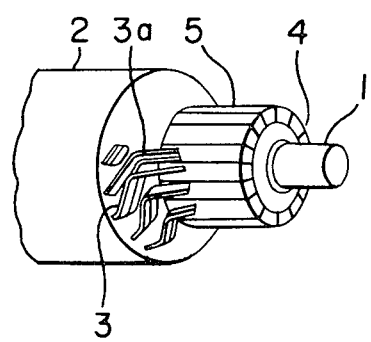
FIG. 1 is a slant view of the armature prepared by the conventional method.
Figure 2:
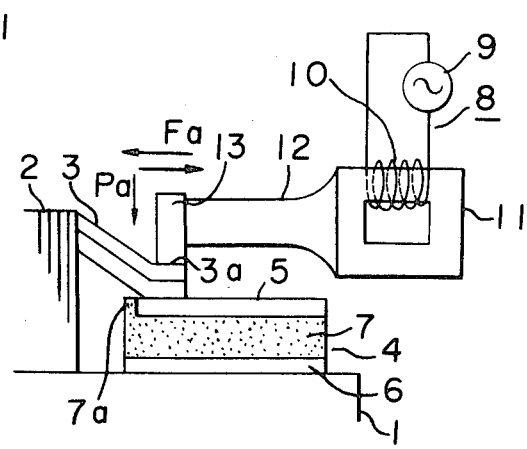
FIG. 2 is a sectional view of the apparatus for using the conventional method of connecting the armature coil of a rotary machine.
Figure 3:
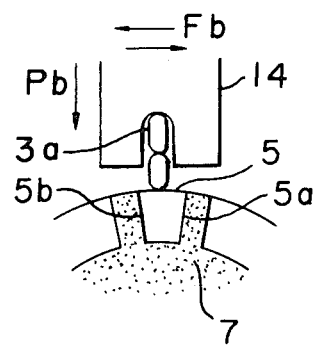
FIG. 3 is a sectional view illustrating an embodiment of the method of the present invention.

FIG. 3 is a sectional view for illustrating a method according to the present invention. In FIG. 3, the reference numerals (5a) and (5b) designate side surface portions in the circumferential direction of the segment (5) and (14) designates a tip which is mounted on the ultrasonic vibrating apparatus (8) to apply to the coil end (3a) of the armature coil vibration which consists of a compressing force (Pb) and a vibrating force (Fb).

In the ultrasonic welding method of the invention, the coil end (3a) is applied with ultrasonic vibration by the tip in a direction perpendicular to the axial direction of the shaft i.e. the transverse direction of the segment (5) as shown by the arrow (Fb) in FIG. 3 whereby the welding of the coil end (3a) of the armature coil and the segment (5) is performed.

In this embodiment, since the ultrasonic vibration is applied to the segment (5) in the traverse direction, the pressure of the axial vibrating force is received by both of the side surface portions (5a), (5b) of the segment (5) to compress the molded substrate (7). The molded substrate can be formed by phenol resin and inorganic filler etc. to impart a high compressive strength. Accordingly, the molded substrate can have a stress sufficiently higher than that of the conventional structure wherein the pressure caused by the excited vibrating force is received by both of the adhesion strength of the molded substrate (7) to the segment and the bonding strength of the end portion (7a) of the molded substrate (7) to the segment, whereby the disadvantage of the conventional method of applying vibration can be overcome.

Figure 4:
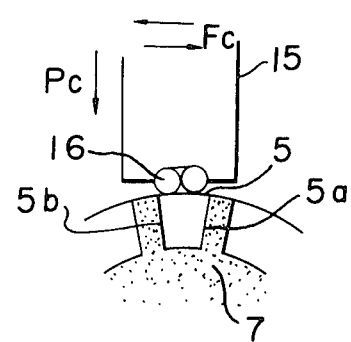
FIG. 4 is a sectional view illustrating another embodiment of the present invention.

FIG. 4 shows another embodiment of the ultrasonic welding of the invention wherein the coil ends (16) having a circular cross section of the armature coil are positioned in parallel on the periphery of the segment (5). In the embodiment, the coil ends (16) are connected to the segment (5) by welding them under the application of a compressive force (PC) with the tip (15) and a vibrating force (PC) by the ultrasonic vibration. In this case, each coil end (16) of the armature coil is directly welded to the segment (5) since the vibrating force (FC) from the tip (15) is directly applied to each coil end (16) whereby a multiple effect improving reliability of welding can be obtained.

In the embodiments described above, the ultrasonic vibration is applied in the direction perpendicular to the axial direction of the shaft (1). Thus, the similar effect can be expected even in the application of vibration in the oblique direction, that is, the ultrasonic welding of the coil end (3a) of the armature coil (3) to the segment (5) can be performed by determining the application of vibration so that a component of vibrating force in the axial direction of the shaft is smaller than the combined strength of the adhesion strength and the bonding strength of the molded substrate to the segment (5).

The present invention can be applied to the connecting of conductors of electric devices and apparatuses as well as the connecting of the armature coil of a rotary machine.

I claim:

1. In a method of connecting an armature coil of a rotary machine to a segment by applying ultrasonic vibration to the armature coil, said rotary machine comprising the armature and a commutator fitted in the circumference of the shaft and formed by molding with a molded substrate a plurality of the segments to be in one piece, an improvement which comprises applying ultrasonic vibration for welding to the armature coil in the direction substantially perpendicular to the axial direction of the shaft to perform the welding whereby a component of vibrating force in the axial direction of the shaft is smaller than the force necessary to overcome the bonding strength of the molded substrate to the segment.

2. In a method of connecting an armature coil of a rotary machine to a segment by applying ultrasonic vibration to the armature coil, said rotary machine comprising the armature and a commutator fitted in the circumference of the shaft and formed by molding with a molded substrate a plurality of the segments to be in one piece, an improvement which comprises applying ultrasonic vibration to the armature coil in the direction oblique to the axial direction of the shaft to perform the welding whereby the component of vibrating force in the axial direction of the shaft is smaller than the force required to overcome the bonding strength of the molded substrate to the segment.

* * * * *